US008385976B2

(12) United States Patent
Middleton

(10) Patent No.: US 8,385,976 B2
(45) Date of Patent: Feb. 26, 2013

(54) MULTI-SIM CELLULAR TELEPHONE

(75) Inventor: Bobby D. Middleton, Albuquerque, NM (US)

(73) Assignee: Bobby D. Middleton, Albuquerque, NM (US)

( * ) Notice: Subject to any disclaimer, the term of this patent is extended or adjusted under 35 U.S.C. 154(b) by 0 days.

(21) Appl. No.: 12/927,023

(22) Filed: Nov. 4, 2010

(65) Prior Publication Data

US 2012/0115545 A1 May 10, 2012

(51) Int. Cl.
*H04M 1/00* (2006.01)
*H04M 9/00* (2006.01)

(52) U.S. Cl. ..................... 455/558; 455/550.1; 455/557; 455/552.1; 379/433.09

(58) Field of Classification Search .................. 455/558, 455/435, 552, 575, 422.1, 450, 424, 552.1, 455/557; 379/210.05, 433.09
See application file for complete search history.

(56) References Cited

U.S. PATENT DOCUMENTS

| | | | | |
|---|---|---|---|---|
| 4,852,151 | A * | 7/1989 | Dittakavi et al. | 379/93.35 |
| 5,987,325 | A * | 11/1999 | Tayloe | 455/435.2 |
| 7,369,848 | B2 | 5/2008 | Jiang | |
| 7,613,480 | B2 | 11/2009 | Brown | |
| 2003/0125073 | A1 * | 7/2003 | Tsai et al. | 455/552 |
| 2006/0234693 | A1 * | 10/2006 | Isidore et al. | 455/422.1 |
| 2009/0029736 | A1 * | 1/2009 | Kim et al. | 455/558 |
| 2010/0056181 | A1 * | 3/2010 | Rippon et al. | 455/456.3 |

* cited by examiner

*Primary Examiner* — Jinsong Hu
*Assistant Examiner* — Opiribo Georgewill

(57) ABSTRACT

Disclosed is a multi-SIM cellular telephone capable of accessing information on multiple SIM cards for multiple cellular service subscriptions while simultaneously accessing full functionality of all other features on the handset. It allows users to insert multiple SIM cards, each with a unique IMSI number associated with a unique cellular service subscription. The user can remove any SIM card and port to other handsets at his/her discretion. Purchasing extra cellular service for such purposes as business use is less expensive than was heretofore possible. Some services are only required on one subscription in order for the service to be used since the microprocessor assesses the features of each subscription and applies the required functionality to that SIM card. The multi-SIM cellular telephone also has a phone number that is associated with the handset; this number allows communication to and from the user of the multi-SIM phone on any installed subscription.

4 Claims, 3 Drawing Sheets

Communication Connection Logic

Mode Logic for Communication via Service Provider of SIM 1
(Signal 1)

MULTI-SIM CELLULAR TELEPHONE

BACKGROUND OF THE INVENTION

1. Field of the Invention

The present invention relates to a multi-SIM cellular telephone which allows a single cellular telephone to simultaneously access information stored on multiple Subscriber Identity Module (SIM) cards. The multi-SIM cellular phone thus has the capability of allowing the user access to more than one phone number on a single handset. The multi-SIM cellular phone also has a phone number assigned to the device itself so that communication to and from the phone can occur without knowledge of the specific subscriber phone numbers.

2. Description of the Prior Art

Cellular telephones are electronic devices used for full duplex two-way radio communication. Cellular service subscriber information is stored in a SIM embedded on a piece of plastic or other suitable material. Henceforth ‘SIM’ and ‘SIM card’ will be used interchangeably. Typically, one SIM card with a single IMSI is installed in any given mobile handset. This allows a handset user to have only one ‘phone line’ per handset at any given time.

U.S. Pat. No. 7,613,480 describes an invention that allows multiple service subscriptions to be encoded on a single SIM card. This is an upgrade from previous systems that allow only one subscription to be encoded and allows the user to access multiple service regions via software coding.

This design is limited in the fact that if the user chooses to port one subscription to another handset, then all subscriptions must be ported to the new handset (via the physical process of moving the SIM card from one handset to another). Also, it allows service providers to refuse service or to charge higher rates if the customer chooses to buy service on the second subscription from a service competitor. This design is not for a new phone or new way of doing business. For example, if one subscription has conference-calling capabilities and the others do not, then the invention described in U.S. Pat. No. 7,613,480 does not allow the user of the handset to automatically switch to the other line. Instead, the user would need to disconnect the call and have all conference attendees connect to the subscription with conference capabilities, thereby disclosing the phone number to all conference attendees. This deficiency decreases the privacy of the user of the handset. There is also no provision in U.S. Pat. No. 7,613,480 for the handset itself to be assigned a phone number and have calls to this number directed to any or all of the valid subscriptions installed on this phone.

U.S. Pat. No. 7,369,848 describes a means by which a person with a cell phone who is outside his/her home network is able to use a single SIM card in order to operate in either the home region or roaming region. The purpose of this invention is to provide a more seamless transition from home service to roaming service.

This invention is limited in that it requires cooperation between multiple service providers and it places priority on one subscription at a time. Thus, there is a ‘home’ IMSI and a ‘local’ IMSI. There is also limited portability of the subscriptions among different handsets. Furthermore, there is no provision in U.S. Pat. No. 7,369,848 for the phone that uses this invention to be assigned a number that is attached to the IMEI number of the handset. Therefore, all phone calls must be directed to a particular subscription rather than to the number associated with the phone itself.

SUMMARY OF THE INVENTION

The present invention is a multi-SIM cellular telephone that allows the holder of the cell phone handset to have multiple cellular subscriptions (hereafter also known as channels) assigned to the same handset. In size and appearance, it will be similar to current cell phones, but will utilize a microprocessor that is capable of connecting to multiple SIM cards, each of which is associated with a particular subscription to a cellular service carrier. These subscriptions may or may not be for service with different cellular service carriers.

It is therefore a primary object of the present invention to provide the user of the handset access to more than one cellular phone line on a single handset.

It is another object of the present invention to allow the user of the phone an economical means of adding additional cellular subscriptions to a single handset for such purposes as obtaining a business phone without buying a new handset.

It is a further object of the present invention to provide a device that will significantly enhance the convenience and privacy of consumers who have need of multiple cellular telephone lines.

It is another object of the present invention to provide the customer with the strongest possible signal from any of the cellular carriers for which the user has a subscription.

These and other objects of the present invention will become apparent to those skilled in this art upon reading the accompanying description, drawings, and claims set forth herein. It will be apparent to those skilled in this art that many embodiments of the present invention are possible without

DETAILED DESCRIPTION OF THE INVENTION

Figure 1:
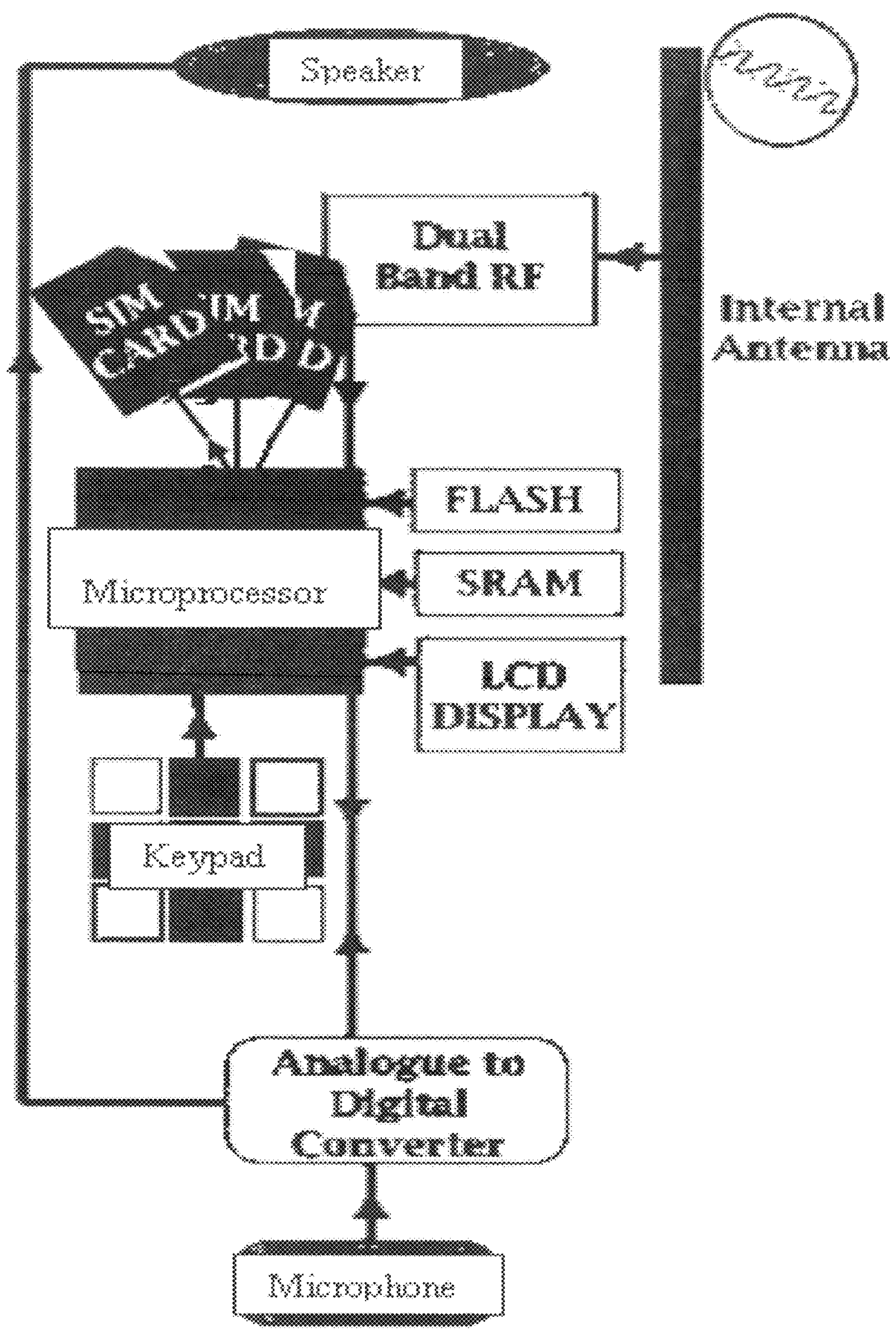
FIG. 1 is a simplified flow diagram showing how multiple SIM cards 1 are connected to the single microprocessor 2 in the present invention.

FIG. 1 is a modified simplified schematic demonstrating the best mode contemplated by the inventor of the multi-SIM cellular phone. It shows how the microprocessor in the cell phone connects to multiple SIM cards, thus allowing all other features of the cell phone to be available without duplicating these features. In FIG. 1, an arrow is directed from the microprocessor to a particular SIM card. This arrow is for visualization purposes only; it represents the idea that the microprocessor is currently applying the subscription properties of that particular SIM (e.g., a conversation with someone who called the phone number associated with this SIM). It is not necessary for there to be a physical connect/disconnect process since the information transfer is accomplished via software and one embodiment of the invention allows the user to switch among the various SIMs via a keyboard or touchscreen interface. The user of the multi-SIM cellular phone is able to buy temporary cellular service from any service provider who sells such service installed on a SIM card and install this service in any open slot in the multi-SIM holding bay that is part of the phone. This service can be installed and initiated at the service provider’s retail location. The invention has enough Random Access Memory (RAM) and Read Only Memory (ROM) to allow the microprocessor to operate all standard functions of modern cell phones as well as the multiple phone subscriptions that are installed on the handset.

Figure 2:
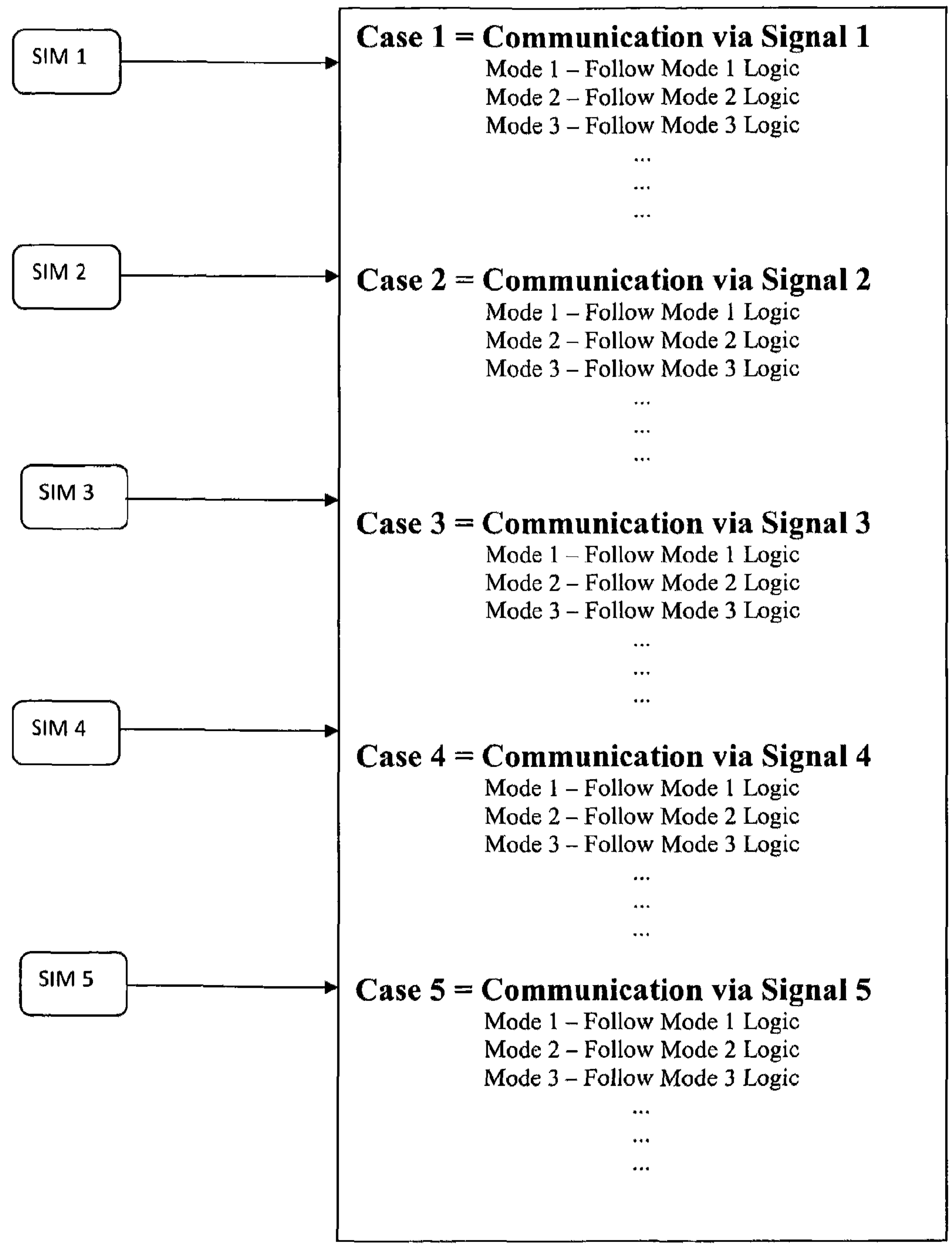
FIG. 2 is a simplified block diagram showing how the logic installed via firmware on the microprocessor of the multi-SIM cellular phone would direct communication via one of five installed subscriptions to one of multiple modes of operation
Figure 3:
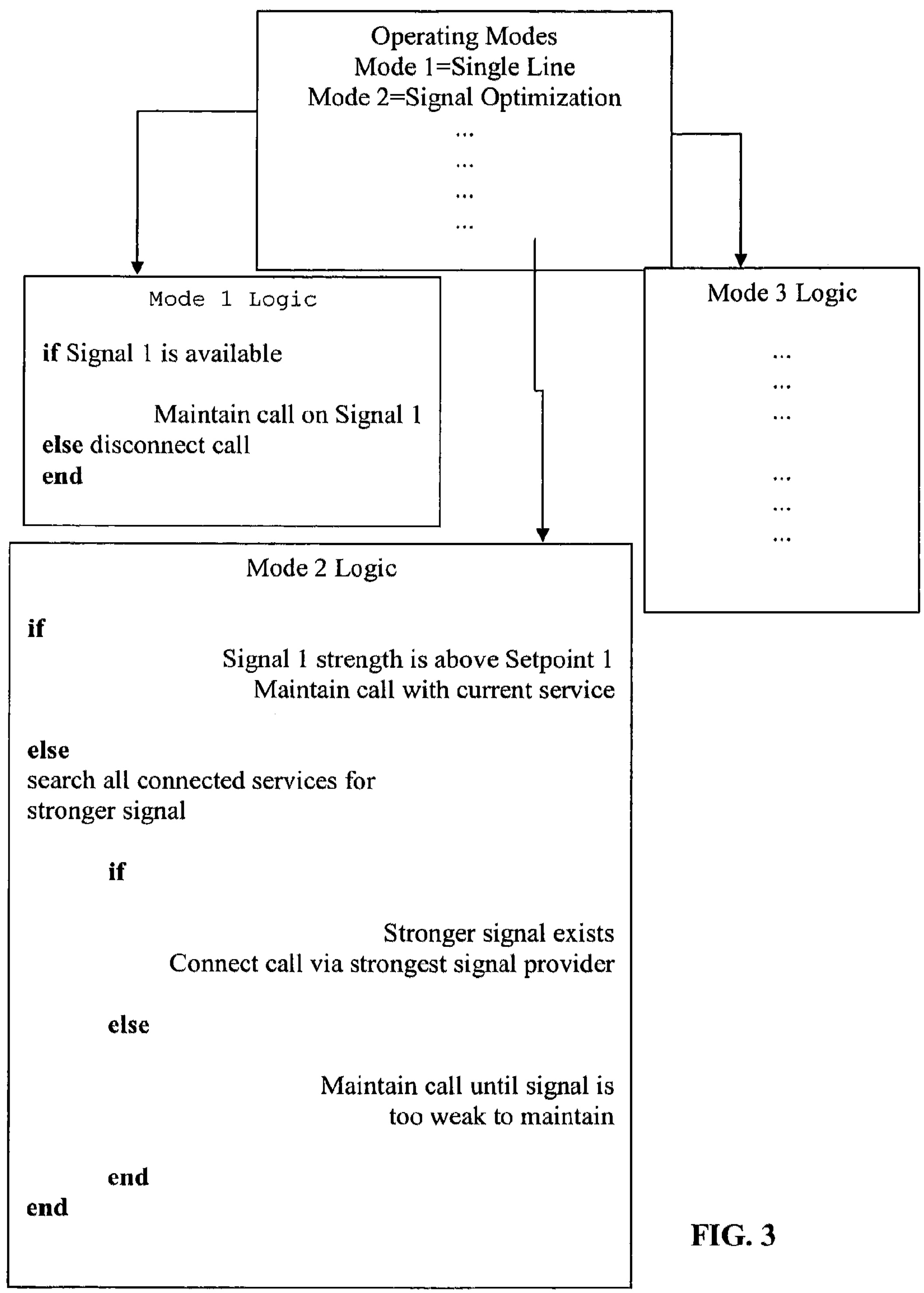
FIG. 3 is a simplified block diagram showing how the multi-SIM cellular phone would have logic for multiple operating modes if communication is active via SIM card 1.

FIG. 2 presents a simplified block diagram of the initial stages of the firmware associated with communications on a multi-SIM cell phone with five installed SIM cards. If communication is established via any of these subscriptions, then the pre-selected operating mode of the phone is invoked. FIG. 3 presents a simplified block diagram of some of the possible operating modes. It is important to note that the number of and complexity of the operating modes is only limited by the creativity of the firmware engineers.

As all SIM cards that are inserted are physically connected to the microprocessor at all times, the microprocessor monitors incoming signals for all SIM cards even if the channel selector is set for one particular channel. The microprocessor allows the user of the handset to enter a description for each channel so that the user knows immediately which number is being dialed for any incoming signal. The user then has the option of accepting the incoming call, which immediately causes the attributes of that particular subscription to be accessed and used in the standard way.

The multi-SIM cell phone has the capability of monitoring all subscriptions and determining which subscription is best for the particular task at hand. For example, suppose the handset user wishes to access the interne via a 3G network. The multi-SIM cell phone monitors the strength of all installed subscriptions and will connect via the fastest connection unless the user has selected another service provider a priori.

The microprocessor monitors signal strength for all SIM cards on the handset. In this way, one mode of operation allows the phone to smoothly switch to a stronger signal if the user so chooses. In this mode, the phone monitors signal strength and if signal strength drops below a pre-set level, then a stronger signal is chosen if available and a call is automatically placed to the other participant. If only one participant is using the multi-SIM phone or if both participants are using the multi-SIM phone but this mode is selected by only one participant, then the receiver of the phone call that has been initiated will be required to accept the transfer. However, if both participants are using the multi-SIM phone and this mode is selected on both phones, then the transition will be achieved automatically.

The microprocessor monitors subscription characteristics for all SIM cards that are connected to it. Therefore, in one operating mode, cost to the user can be minimized. Similar to the operating mode that ensures signal strength is optimized (discussed in paragraph [0020]), cost can be minimized by monitoring the service area and the characteristics for the multiple subscriptions. This cost minimization process is subject to constraints entered by the user. For example, the user can enter minimum signal strength before the signal optimization process is initiated and cost among the different subscriptions will be minimized until signal level drops below that pre-set value. Then, the cost optimization process is initiated on the remaining subscriptions.

All peripheral services that are standard on any current cellular telephone are available to the multi-SIM cellular phone user. These services—such as texting, interne access, games, etc.—are also controlled via the microprocessor of the multi-SIM cellular phone. If one phone line is busy and the user of the multi-SIM cellular phone receives a call on any of the lines installed on the handset, then the option is given to the user of the phone to either place the current caller on hold, to drop the current caller, to ignore the incoming call, or—if conferencing is available on any of the installed lines—to conference the incoming call into the conversation.

The only connection among the SIM cards to each other are via the microprocessor. Thus, no service provider of one subscription has access to the other subscriptions unless they are provided by the same company. For example, if a customer pays for two lines from the same service provider, then it is obvious that the provider will have information from both subscriptions. However, if a customer pays for a subscription that provides many options—such as texting, conferencing, web service, etc.—from one service provider but chooses to buy only basic service from a second provider, neither provider will be able to access this information via the multi-SIM cellular phone.

The multi-SIM cellular phone has multiple operating modes that allow the user to choose among multiple optimization schemes of the multi-SIM phone. Some examples of these modes are: a signal-strength optimization mode that ensures the strongest possible signal is available for use if multiple service providers are represented on the installed SIM cards; a cost-minimization mode that ensures the least expensive service provider is being used for communication at any point in time; a single-subscription mode that restricts communication to a single subscription; and an elimination mode that allows the user to choose to eliminate communication via any or all installed subscriptions.

The microprocessor has firmware installed on it that can coordinate conference calling locally (on the phone itself) instead of requiring that a conference-call feature be part of a subscription paid for by the subscriber. In the case of the user of the multi-SIM handset initiating the conference call, the user would input all numbers that he/she wishes to dial, up to and including the total number of installed subscriptions on the phone. The phone would then dial these numbers, using a separate subscription for each number being dialed. The microprocessor would then coordinate all communications to and from each conference attendee. For incoming calls, each incoming communication would be routed to a different subscription and the multi-SIM cell phone user would have the option of conferencing in each additional caller, up to and including the number of installed subscriptions.

The multi-SIM cell phone has a phone number that is assigned to the handset (as opposed to the subscriptions). If a person dials this phone number, then all subscriptions that are installed on this phone are queried via their respective networks. If the multi-SIM phone is within range of any of these networks, the communication is established. If the phone is within communication range of more than one network, then one of the installed subscriptions is selected via the operating mode chosen a priori by the user of the handset and communication is established via this subscription.

Thus it will be appreciated by those skilled in the art that the present invention is not restricted to the particular preferred embodiments described with reference to the drawings, and that variations may be made therein without departing from the scope of the present invention as defined in the appended claims and equivalents thereof.

What is claimed is:

1. A cellular telephone, comprising: a mobile telecommunications handset; an integrated circuit contained in the handset; a microprocessor contained in the handset that coordinates all activities associated with three or more subscriber identity module (SIM) cards, said microprocessor consisting of an arithmetic/logic unit (ALU), an instruction register, an instruction decoder, firmware that instructs the microprocessor to coordinate all communications associated with all SIM cards connected to said microprocessor, and firmware configured to enable said microprocessor to coordinate conference communication among all subscriptions installed on the aforementioned cellular phone without requiring any of said subscriptions to have conferencing service installed individually; a device contained in the handset that is configured to hold three or more SIM cards, said device simultaneously connecting all said SIM cards to said microprocessor; said telephone choosing among a suite of operation modes for said telephone, said suite consisting; a “signal-strength optimization mode”, whereby said telephone monitors signal strength available to all subscriptions installed on said telephone via SIM cards and ensures that when the signal that is actively being used for communication, said communication being either voice communication or data communication, drops below a pre-defined set-point, then said telephone automatically effects a smooth transition from said subscription that is actively being used for communication to the strongest available signal; a “cost minimization mode” that monitors location and all features of all subscriptions installed via SIM cards, including cost, and minimizes cost to the user based on the features being used at that time by automatically switching services used for all communications to the subscription with the lowest marginal cost; a “single-subscription mode” that operates on only a single subscription at a time, said subscription being selected a priori by the user, said telephone monitoring all channels but not switching among channels for optimization of cost, signal strength, or any other characteristic of the installed subscriptions; said telephone also accepting the installation of a SIM card with a temporary subscription from a cellular service provider that is not represented on any of the SIMs that are currently installed on said telephone and connecting said SIM card with temporary subscription to said microprocessor; said telephone also monitoring all incoming communication activity from all installed subscriptions even when one subscription is actively being used for communication, said telephone then offering the user of said handset options by which he/she many choose to disconnect from current communication and accept incoming communication, to place current communication on hold and accept incoming communication, or to ignore incoming communication; said telephone coordinating wireless communications via multiple wireless service subscriptions including full two-way duplex radio telecommunications, said subscriptions being identified by unique International Mobile Subscriber Identifier (IMSI) numbers, each IMSI number being assigned a unique mobile service telephone number.

2. A cellular telephone according to claim 1, wherein said telephone contains a multi-SIM card holding bay, said holding bay being configured to hold three or more SIM cards and connecting them simultaneously to the aforementioned microprocessor of claim 1.

3. A cellular telephone according to claim 1, wherein communication via any and/or all subscriptions installed on said telephone can be eliminated by the user of said telephone.

4. A cellular telephone according to claim 1, wherein said telephone has Random Access Memory (RAM) and Read Only Memory (ROM) to allow the microprocessor of claim 1 to perform all required operations.

* * * * *